United States Patent [19]

Chen et al.

[11] Patent Number: 5,592,620

[45] Date of Patent: Jan. 7, 1997

[54] SYSTEM AND METHOD FOR CONTROLLING, MONITORING AND RETRIEVING ACCOUNTING DATA

[75] Inventors: David D.-H. Chen, Cary; Leo Temoshenko, Raleigh, both of N.C.

[73] Assignee: International Business Machines Corporation, Armonk, N.Y.

[21] Appl. No.: 105,543

[22] Filed: Aug. 12, 1993

[51] Int. Cl.⁶ .............................. G06F 13/00; G06F 17/30
[52] U.S. Cl. ................... 395/200.01; 395/200.11; 395/200.15; 395/610; 364/222.2; 364/222.81; 364/242.94; 364/DIG. 1
[58] Field of Search ..................................... 395/600, 200, 395/550, 700, 200.2, 200.12, 200.15, 200.17, 182.02

[56] References Cited

U.S. PATENT DOCUMENTS

| | | | |
|---|---|---|---|
| 5,109,486 | 4/1992 | Seymour | 395/200 |
| 5,204,955 | 4/1993 | Kagei et al. | 395/575 |
| 5,257,384 | 10/1993 | Farrand et al. | 395/725 |
| 5,367,670 | 11/1994 | Ward et al. | 395/575 |
| 5,375,070 | 12/1994 | Hershey et al. | 395/550 |
| 5,448,724 | 7/1993 | Hayashi | 395/182.02 |

Primary Examiner—Thomas G. Black
Assistant Examiner—Hosain T. Alam
Attorney, Agent, or Firm—Stephen T. Keohane; John J. Timar

[57] ABSTRACT

A new system and method allow a Manager in a network to control, monitor and receive accounting from its Agents. The system and method comprise the unique provision and use of an accounting file which is used by each Agent for maintaining the accounting information database for the Manager. The agent collects the accounting data specified by the Manager and stores it in the accounting data file. The Agent further maintains a status record based upon the status of the accounting data collection activity. If the Agent has completed collecting the accounting data as specified by the Manager, the status record indicates that the file is in a full state, or COMPLETE. Alternatively, if the Agent is still in the process of collecting and storing the accounting data, the status record will indicate that the accounting file is in an active state, or ACTIVE. In operation, the Manager first issues a command to each of its Agents to begin collecting and storing a particular type and amount of accounting data. Periodically, the Manager polls its Agents to determine which of them has completed the collecting and storing of the accounting data as indicated by a COMPLETE status record. The Manager then issues a request for receiving the accounting data file, using a file transfer protocol (FTP), from those Agents which have complete accounting files.

14 Claims, 5 Drawing Sheets

TG = Transmission Group

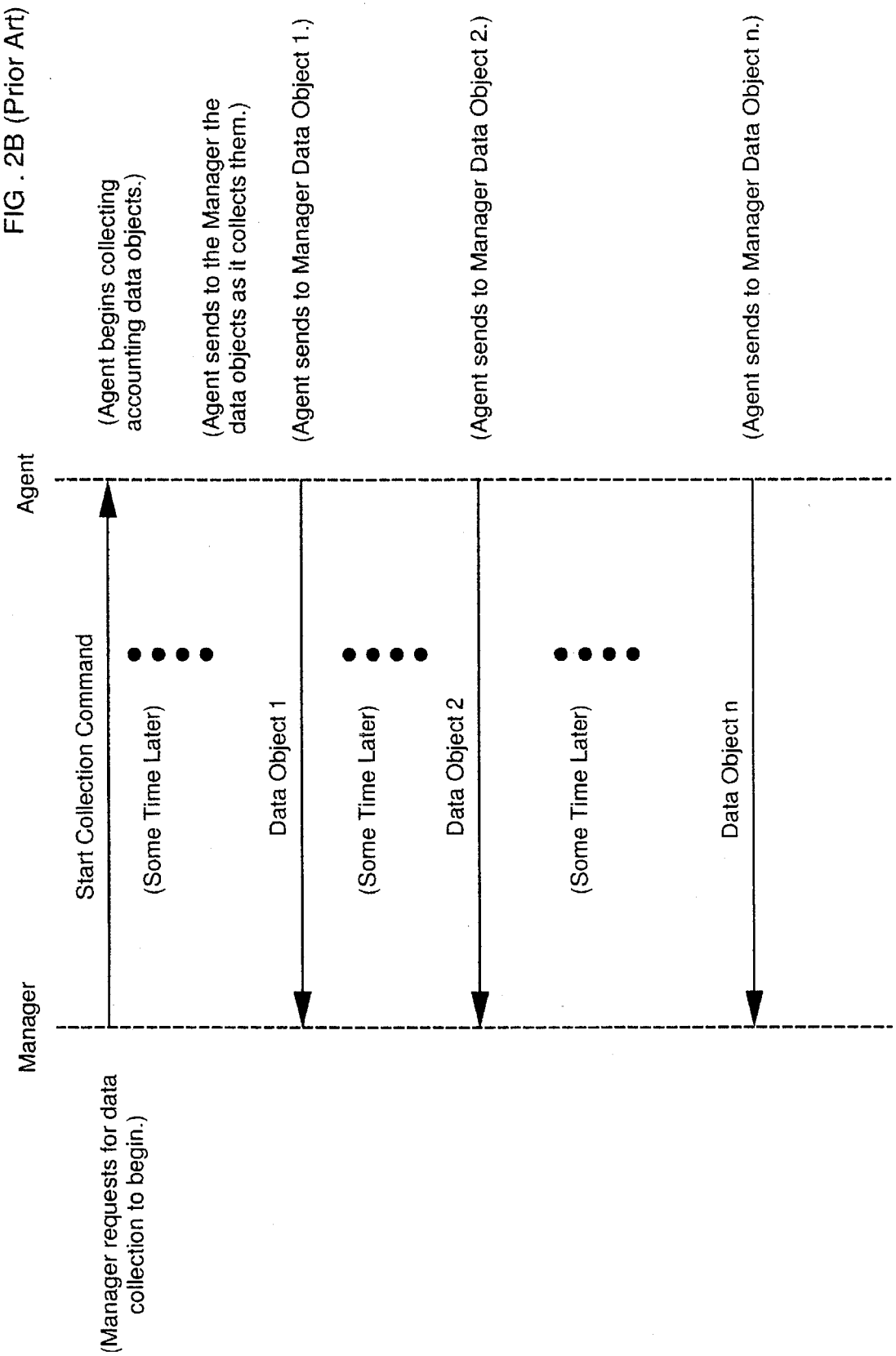

SYSTEM AND METHOD FOR CONTROLLING, MONITORING AND RETRIEVING ACCOUNTING DATA

Applicants have filed three related patent applications; D. Chen et al., Ser. No. 08/034,068 filed on Mar. 22, 1993, now abandoned, D. Chen et al., Ser. No. 08/042,952 filed on Apr. 5, 1993, and D. Chen et al., Ser. No. 08/123,547 ifled on Sep. 20, 1993.

BACKGROUND OF THE INVENTION

I. Field of the Invention

The present invention relates to network management and, more particularly, to a system and method for controlling, monitoring and retrieving accounting data by a network manager from its managed network components.

II. Background and Prior Art

Data communication has become a fundamental part of computing. World-wide networks gather data about such diverse subjects as atmospheric conditions, crop production, and airline traffic. These network have evolved as independent entities without the ability, or, until recently, the need, to interconnect with one another. New technologies, generically named "internetworking", have emerged making it possible to interconnect many disparate physical networks and make them function as a coordinated unit. Using internetworking technologies, a host, for example, on one network, may traverse multiple networks and communicate with another host on a different network.

The size of an "internet", Or group of interconnected networks, can vary quite significantly. For instance, the resulting network may be enormously large, such as the nation-wide DARPA (Defense Advanced Research Projects Agency)/NSF (National Science Foundation) Internet which connects most major research institutions, including universities, corporate and government labs. Conversely, the network may be relatively small, comprising only a single corporation's individual local area networks (LANs).

No matter the size of the network, it is clear that the task of effectively managing the resulting interconnected network is quite important and has been given a great deal of attention in the networking community. In managing an interconnected network, a network manager must keep track of the devices on the network, monitor the network's performance and load, and diagnose and correct any problems.

The network manager is charged with, among other things, monitoring network performance and status, controlling operational parameters, and reporting, analyzing and isolating faults in its managed domain. Furthermore, the manager must keep an accounting of the activity in its managed domain for customer billing, performance analysis, capacity planning and problem determination. In order to effectively accomplish these functions, the manager requires precise and timely accounting data regarding the network activity from the nodes in the network.

Using presently available network management protocols such as SNMP (Simple Network Management Protocol) and CMIP (Common Management Information Protocol), network administrators (via "Managers") can address queries and commands to managed network nodes and devices (via "Agents") in order to retrieve this accounting data.

FIG. 1 illustrates a simplified network having four interconnected nodes, Node 1, Node 2, Node 3 and Node 4. The nodes are logically interconnected by transmission groups (TGs). As can be seen, Node 1 is connected to Node 2 by TG A, Node 1 to Node 4 by TG E, and so forth. Each node is a managed network device and has an Agent (agent1, agent2, agent3, agent4) for collecting management data and for responding to the Manager, which is logically connected to each Agent. The management data includes accounting data for different categories of data traffic.

Using present accounting monitoring and retrieval systems and methods, the Manager gathers the accounting data and storing the data in accounting files (e.g., Agent1's File1 and File2) from its Agents in a rather straight forward manner. After the Agent begins collecting the accounting data, the Manager explicitly retrieves the collected data through a request/response sequence or the data is automatically sent to the Manager (without being requested or solicited).

FIGS. 2A and 2B illustrate these traditional accounting retrieval methods, respectively. In particular, FIG. 2A illustrates the flow of messages exchanged between a Manager and an Agent where the Manager is requesting that the Agent collect some particular accounting data and retrieves it data object-by-data object. The messages are illustrated as arrows pointing in the direction of the message flow, the message indicator being positioned directly above its corresponding arrow.

Initially, as discussed above, the Manager requests that the Agent begin collecting some particular accounting data, such as, for example, data regarding the traffic for a specific network protocol. After some period of time, the Manager issues a request for the first data object (Data Object 1). This is accomplished by the Manager using the specific management protocol commands. For example, using the SNMP protocol, the Manager Would issue a GetNextRequest PDU (Protocol Data Unit) without specifying any instance of the data object. The Agent then responds with the first data object using the corresponding protocol command, i.e., GetResponse in the SNMP protocol. In the present example, the Agent responds with the first data object (Data Object 1), if it has already collected it. The Manager follows with a request for the data object after Data Object 1 and the Agent replies with Data Object 2. The Manager then requests the data object after Data Object 2. Because the Agent has not yet collected this data object, it responds to the Manager with a "No Such Data Object" response, indicating to the Manager that it has not yet collected that data object. After a period of time, the Manager again requests the data object after Data Object 2. Again, the Agent has not yet collected that object. Some time later, the Manager retries to retrieve the data object after Data Object 2. By this time, the Agent has collected the data object and sends it to the Manager. This example has been described as the Manager requesting and receiving the accounting data on an object-by-object basis. Alternatively, however, the Manager may request and receive the data on a record-by-record basis where a record contains a predetermined number of objects.

Clearly, this is a cumbersome and inefficient process for both the Manager and the Agent. Using this prior art technique, both the Manager and Agent are responsible for dedicating a large percentage of processing time to accommodate the retrieval of accounting data. This interferes with the primary functions of both the Manager and the Agent.

FIG. 2B illustrates another prior art method of collecting, monitoring and retrieving accounting data. Using this technique and system, the .Manager initially requests that the Agent begin collecting the particular accounting data. The Agent, as it collects this accounting data, sends the data objects to the Manager in an asynchronous manner such as by using interrupts. As with the example above, the data may be sent to the Manager in an object-by-object basis or in a record-by-record basis.

As with the previous method, the Manager initially requests that the Agent begin the collection of accounting data. After the Agent has collected the first data object (Data Object 1), it sends the data object to the Manager using a type of interrupt. In a similar manner, the Agent sends the remaining data objects as they are collected (Data Object 2, Data Object 3 ... Data Object n, where n is the total number of records that the Manager wants the Agent to collect). Also, as with the previous technique, the Agent may send a predetermined number of data objects rather than one at a time.

This prior art technique also has many disadvantages. First, the Manager may be interrupted in its primary function or other tasks having higher priority than the receipt of accounting data, and the sporadic receipt of that data from the Agent may interfere with the performance of those tasks. Further, such sporadic bursts of network activity may impact the performance of the network. Finally, such accounting data may be lost in transit with little or no error control. This strategy is deemed unacceptable from a reliability perspective as the interrupt and the data may never reach the Manager—and/or cannot be controlled by the Manager.

Presently, there is no mechanism for allowing the Manager to effectively control, monitor, and receive accounting data from its Agents.

SUMMARY OF THE INVENTION

A new system and method allow a Manager in a network to control, monitor and receive accounting information from its Agents. The system and method comprise the unique provision and use of an accounting file which is used by each Agent for maintaining the accounting information database for the Manager. The agent collects the accounting data specified by the Manager and stores it in the accounting data file. The Agent further maintains a status record based upon the status of the accounting data collection activity. If the Agent has completed collecting the accounting data as Specified by the Manager, the status record indicates that the file is in a full state, or COMPLETE. Alternatively, if the Agent is still in the process of collecting and storing the accounting data, the Status record will indicate that the accounting file is in an active state, or ACTIVE. In operation, the Manager first issues a command to each of its Agents to begin collecting and storing a particular type and amount of accounting data. Periodically, the Manager polls its Agents to determine which of them has completed the collecting and storing of the accounting data as indicated by a COMPLETE status record. The Manager then issues a request for receiving the accounting data file, using a file transfer protocol (FTP), from those Agents which have complete accounting files.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 2B depicts a flow diagram showing another prior art accounting data control, monitor and retrieval technique between a Manager and an Agent.

DETAILED DESCRIPTION OF THE PREFERRED EMBODIMENT

The method of the present invention may be utilized in any network having management functionality. In the preferred embodiment, the invention is described in terms of a network conforming to the Simple Network Management Protocol (SNMP). In such a network, an SNMP Manager can address queries and commands to Agents responsible for monitoring network nodes and devices. The Manager monitors network performance and status; controls operational parameters; and reports, analyzes and isolates faults in its managed domain.

Using the present invention; the Manager initially requests that its Agents begin collecting and storing a specified amount and type of accounting data. Subsequently, because the Agents collect the accounting data in an accounting file and maintain a record having the status of the file, the Manager periodically polls the Agents to determine when each of its Agents has completed the collecting and storing of the specified accounting data. An accounting file, as used in this specification, is a logical separation of data and may be stored on any type of physical media such as a magnetic tape, a magnetic disk, or a compact disk. When an Agent's accounting file is in a full state, as indicated by the status record, the Manager requests that the accounting file be transferred from the Agent to the Manager using a file transfer protocol (FTP). This process reduces the overhead of having the Manager retrieve the data in an object-by-object or record-by-record basis, or, alternatively, having the Agent send unsolicited interrupts which would severely impact the performance of the network, Agent and Manager or would result in lost records.

Figure 1:
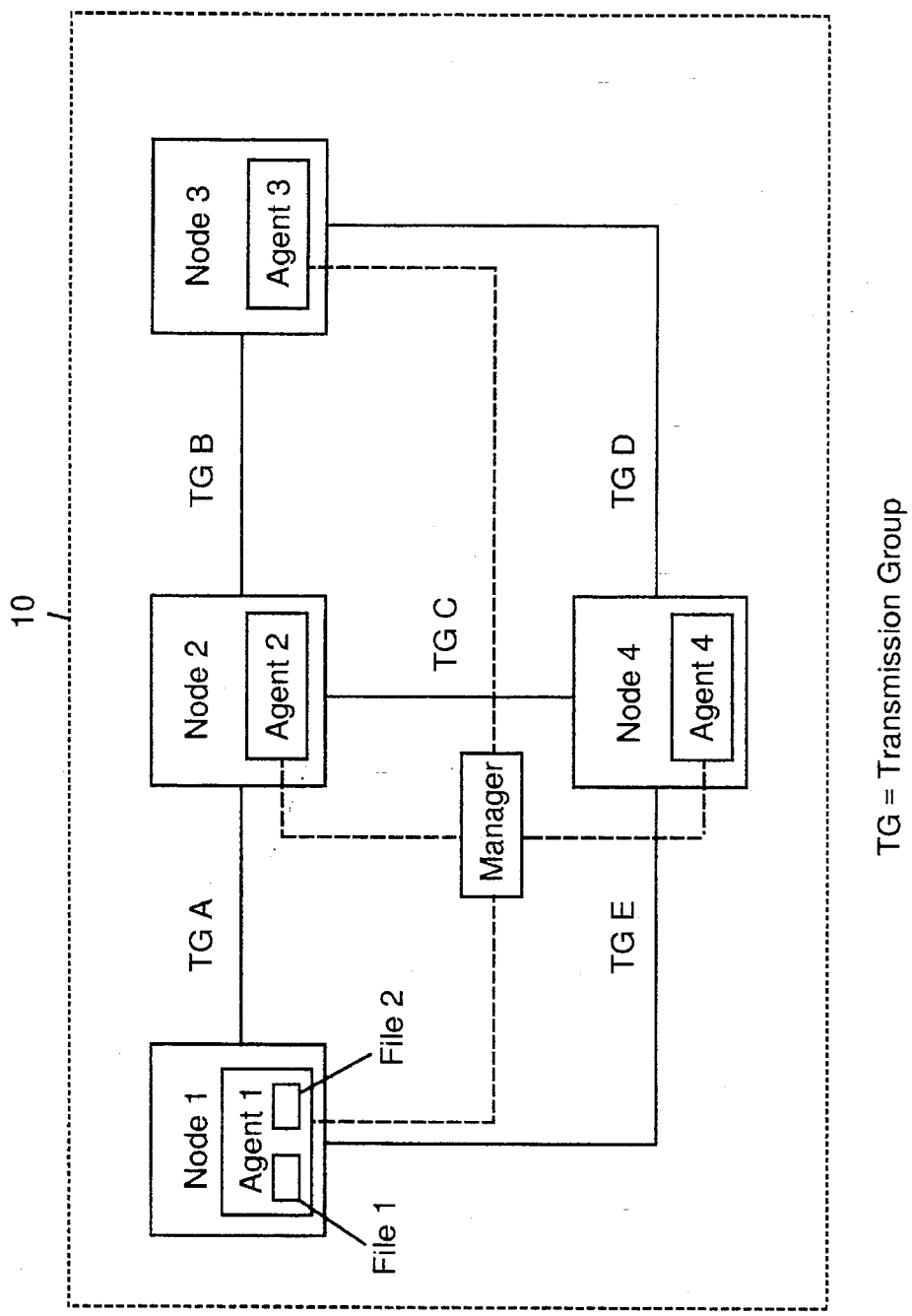
FIG. 1 is a block diagram of a representative communications network within which the present invention may be practiced.
Figure 2A:
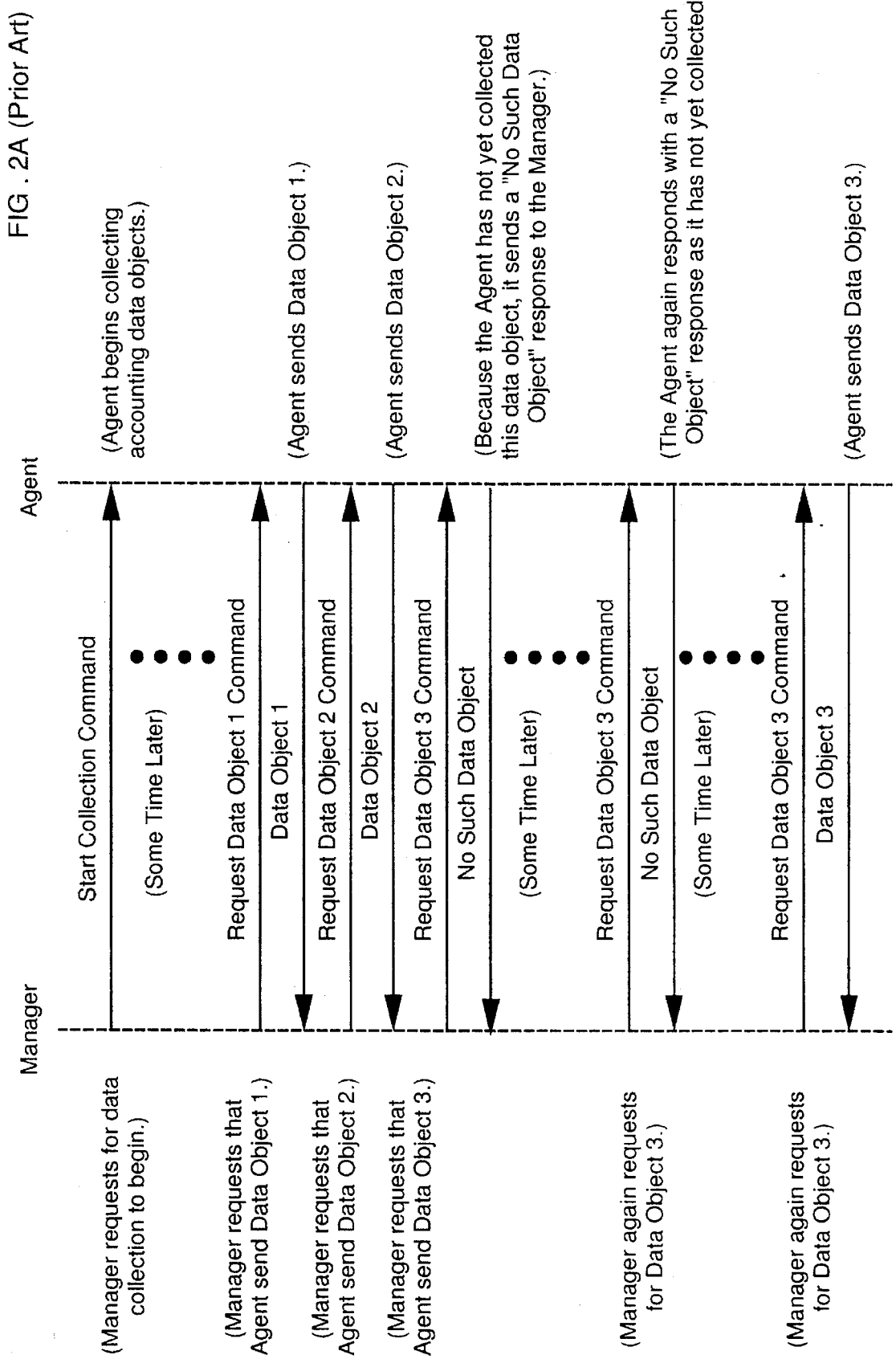
FIG. 2A depicts a flow diagram showing a traditional accounting data control, monitor and retrieval technique between a Manager and an Agent.
Figure 3:
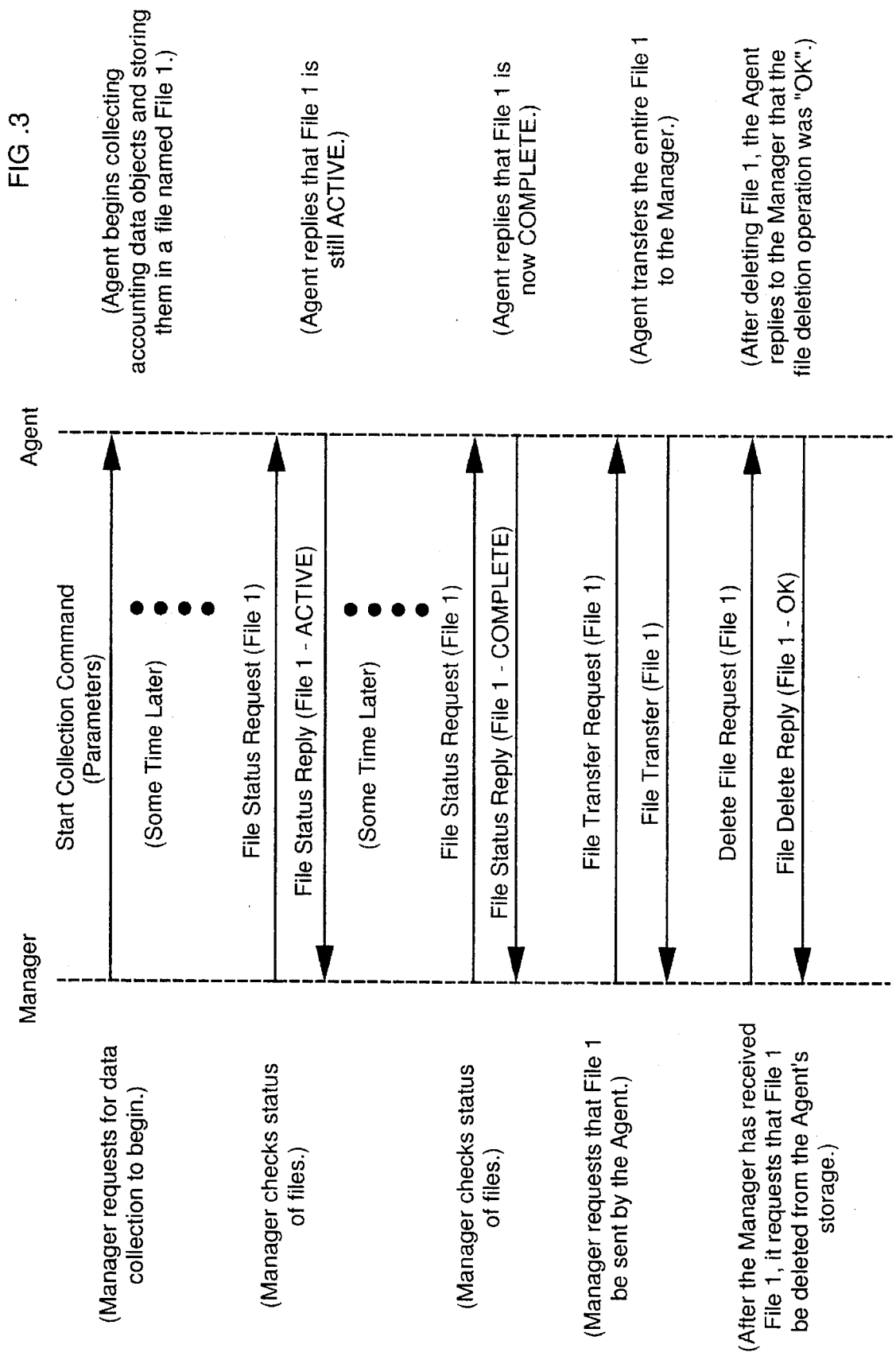
FIG. 3 depicts a flow diagram showing the control, monitor and retrieval method of the present invention.

FIG. 3 illustrates a possible sequence of message flows between a Manager and an Agent implementing the method of the present invention. Initially, the Manager requests that the Agent begin collecting some particular type of accounting data (by issuing a START COLLECTION command with PARAMETERS). At that time the Agent begins collecting the accounting data and stores it in an accounting file. While the Agent is storing the data in the accounting file, the Agent maintains a record indicating that the file status is in an active state, or ACTIVE. (When the file (e.g., "FILE1" of FIG. 1) becomes full, the Agent changes the file status to COMPLETE and begins storing the data in a new file (e.g., "FILE2" of FIG. 1). As shown in the figure, after some period of time, the Manager issues a request for status of the accounting file. The Agent responds with a File Status Reply, indicating that the Agent is still gathering data objects for the accounting file (ACTIVE) or that the accounting file is full (COMPLETE). In the present example, the Agent responds with a message indicating that the file is still ACTIVE. Some time later, the Manager retries to retrieve the accounting file with another status request. This time the Agent is finished collecting the data and responds with an accounting file COMPLETE indicator.

Upon receiving the reply that the accounting file is complete, the Manager can then request that the file be transferred from the Agent to the Manager using a FTP (file transfer protocol). Using the FTP, the entire file is transferred to the Manager rather than individual data objects or records on a one-at-a-time basis. Along with the file transfer request, the Manager must send the file name so that the Agent knows which of its files (e.g., FILE1 or FILE2) to transfer. The Agent, upon receiving this request, transfers the entire accounting data file, File1. After receiving (and storing) File1, the Manager issues a command to delete File1, so that the Agent's storage may be freed up. The Agent deletes this file and verifies this with the Manager.

Figure 4:
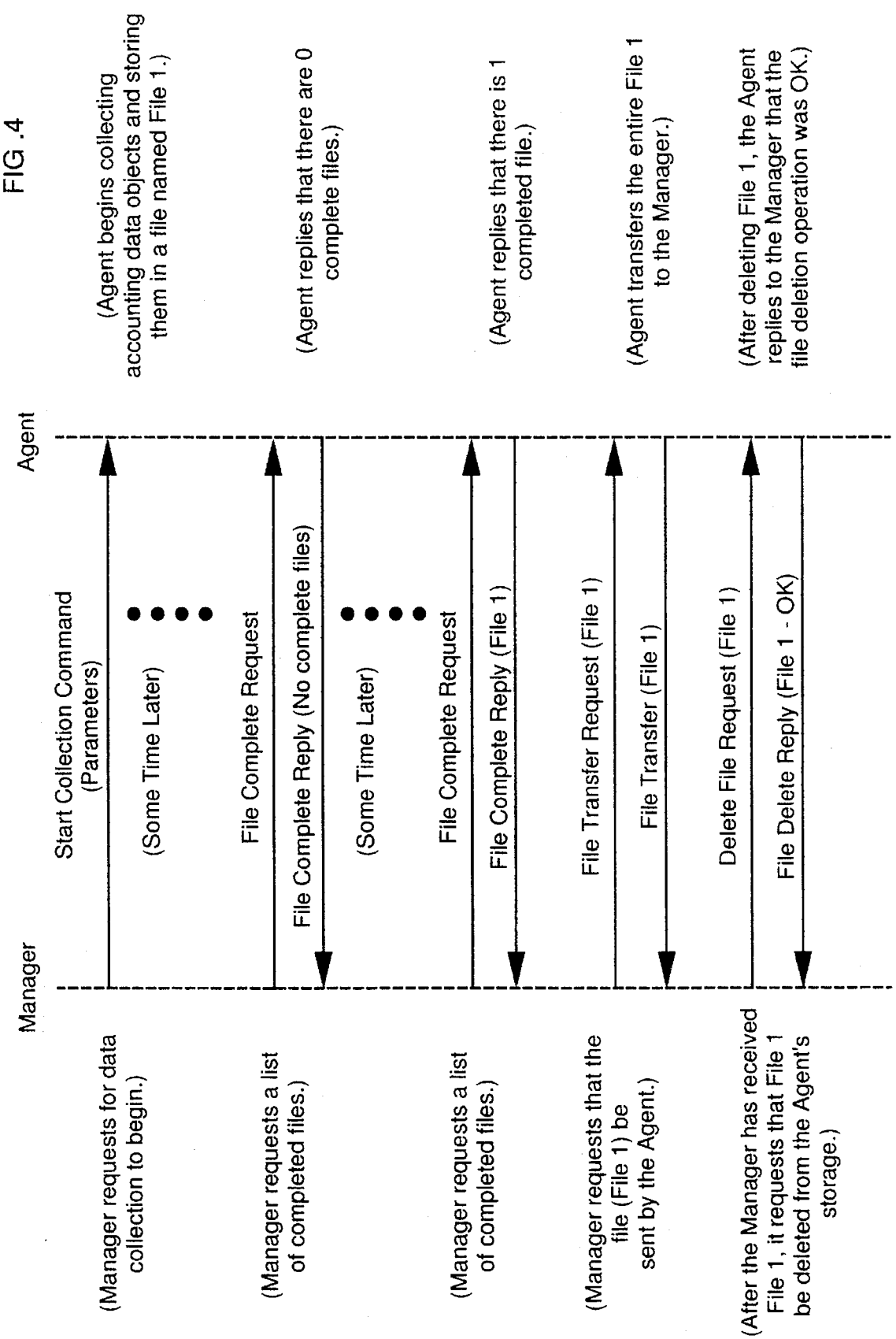
FIG. 4 depicts a flow diagram showing another embodiment of the control, monitor and retrieval method of the present invention.

An alternative method for controlling, monitoring and retrieving accounting data by a Manager frown an Agent is illustrated in FIG. 4. As with the above described method, the Manager requests that the Agent begin collecting and storing accounting data for a particular type of accounting in a file. After a period of time, the Manager requests a list of files for that particular type of accounting from the Agent. If there is a completed file, the Manager knows that it may retrieve it. If there are no completed files, the Manager knows that the Agent is still in the process of collecting and storing data and that there are no completed files to be retrieved. As shown in FIG. 4, in response to the initial request from the Manager, the Agent responds that there are zero COMPLETE files. This indicates to the Manager that no files are ready for transfer. After another period of time, the Manager retries and requests the number of File1_Name files. By this time, the Agent has completed one file (and may be processing another) and so responds to the Manager. At this point, the Manager may retrieve the file using an FTP or may wait until further files are completed. In the example shown in FIG. 4, the Manager requests the file transfer of the completed file. The procedure of the FTP is discussed in detail above.

The method and system described allow a Manager to control the collection of accounting data by its Agents by providing a mechanism by which the Manager may tell its Agents which type and what amount of data that the Agents are to collect. Further, the Manager may tell the Agents where to store the data based upon the capability of the Agent and the purpose of collecting the data. The method and system of the present invention provide a mechanism by which the Manager may monitor the accounting data collection. In this regard, the Manager may either directly request the status of the specified accounting data file or may indirectly determine the status by requesting a list of completed files. Finally, the method and system of the present invention provide a mechanism for retrieving the entire completed accounting data file using an FTP rather than the normal object-by-object or record-by-record.

The method and system of the present invention have been described in terms of an SNMP management protocol system having a plurality of network nodes. The present invention is not specifically directed at SNMP, however, and may be implemented by any management protocol.

Thus, it can be seen that the method and system of the present invention allows a Manager to control, monitor and retrieve accounting data from its Agents in an efficient and noncumbersome manner. While the invention has been particularly shown and described with reference to preferred embodiments thereof, it will be understood by those skilled in the art that various other changes in form and detail may be made without departing from the spirit and scope of the invention.

What is claimed is:

1. For use in a Manager of a network comprising at least one Agent, said Agent having means for collecting accounting data related to network activity, said accounting data comprising a plurality of data objects, a method of controlling, monitoring, and retrieving said data objects comprising the steps of:

requesting said Agent, using Simple Network Management Protocol (SNMP) commands, to being collecting data objects and storing said data objects in one or more accounting files;

maintaining a record at said Agent containing data indicating whether each accounting file is COMPLETE or ACTIVE;

determining from said Agent, using SNMP commands, whether any of said accounting files are complete, said determining step comprising the steps of said Manager periodically issuing, using SNMP commands, a message to said Agent requesting an indication of the status of said accounting file and of said Agent responding with said indication; and requesting, using File Transfer Protocol (FTP) commands, from said Agent, if there are any completed accounting files, to transfer said completed accounting files to said Manager.

2. The method defined in claim 1 further comprising, after said requesting to transfer step, the step of requesting, using FTP commands, said Agent to delete said transferred files upon receipt of said transferred files by said Manager.

3. The method defined in claim 1 wherein said determining step comprises the steps of said Manager periodically issuing, using SNMP commands, a message to said Agent requesting a list of completed accounting files and of said Agent responding with said list.

4. The method as defined in claim 1 wherein said SNMP commands comprise a GetNextRequest PDU (protocol data unit) requesting an indication as to whether any of said accounting files are completed.

5. The method defined in claim 1 wherein said requesting said agent to begin collecting data objects step further comprises the steps of identifying a particular type of data objects to collect, identifying how many of said particular type of data objects to collect, and identifying where to store said particular type of data objects.

6. A network comprising at least one Agent, said Agent having means for collecting accounting data related to the network activity, said accounting data comprising a plurality of data objects, and a Manager for controlling, monitoring, and retrieving said data objects, said Manager comprising means for requesting, using Simple Network Management Protocol (SNMP) commands, said Agent to begin collecting data objects and storing said data objects in one or more accounting files, means for maintaining a record at said Agent containing data indicating whether each accounting file is COMPLETE or ACTIVE, means for determining, using SNMP commands, from said Agent whether any of said accounting files are complete, said means for determining, comprising means for issuing periodically, using SNMP commands, a message to said Agent requesting an indication of the status of said accounting file and means for receiving, using SNMP commands, the response of said Agent having said indication, and means for requesting, using File Transfer Protocol (FTP) commands, from Said Agent, if there are any complete accounting files, to transfer said completed accounting files to said Manager.

7. The network defined in claim 6 wherein said Manager means for requesting said agent to begin collecting data objects further comprises means for identifying a particular type of data objects to collect, means for identifying how many of said particular type of data objects to collect, and means for identifying where to store said particular type of data objects.

8. The network defined in claim 6 wherein said Manager further comprises means for requesting, using FTP commands, said Agent to delete said transferred files upon receipt of said transferred files by said Manager.

9. The network defined in 6 wherein said SNMP commands comprise a GetNextRequest PDU (protocol data unit) requesting an indication as to whether any of said accounting files are completed.

10. In a network comprising at least one Agent, said Agent having means for collecting accounting data related to the network activity, said accounting data comprising a plurality of data objects, a Manager for controlling, monitoring, and retrieving said data objects comprising:

means for requesting, using Simple Network Management Protocol (SNMP) commands, said Agent to begin collecting data objects and storing said data Objects in one or more accounting files, said Agent maintaining a record containing data indicating whether each accounting file is COMPLETE or ACTIVE;

means for determining, using SNMP commands, from said Agent whether any of said accounting files are complete, said means for determining comprising means for issuing periodically, using SNMP commands, a message to said Agent requesting an indication of the status of said accounting file and means for receiving, using SNMP commands, the response from said Agent; and means for requesting, using File Transfer Protocol (FTP) commands, from said Agent, if there are any completed accounting files, to transfer said completed accounting files to said Manager.

11. The Manager defined in claim 10 wherein said means for requesting said agent to begin collecting data objects further comprises means for identifying a particular type of data objects to collect, means for identifying how many of said particular type of data objects to collect, and means for identifying where to store said particular type of data objects.

12. The Manager defined in claim 10 further comprising means for requesting, using FTP commands, said Agent to delete said transferred files upon receipt of said transferred files by said Manager.

13. In a network comprising at least one Manager for controlling, monitoring, and retrieving accounting data related to the network activity, said accounting data comprising a plurality of data objects, an Agent comprising:

means for receiving, using Simple Network Management Protocol (SNMP) commands, a request from said Manager to begin collecting said data objects and storing said data objects in one or more accounting files;

means for collecting said data objects and storing said data objects in a first accounting file;

means for storing said data objects in a second accounting file after said first accounting file is complete;

means for maintaining a record containing data indicating whether each accounting file is COMPLETE or ACTIVE;

means for indicating, using SNMP commands, to said Manager as to whether any of said accounting files are complete, said means for indicating comprising means for issuing, using SNMP commands, a message to said Manager having an indication of the status of said accounting file in response to periodic messages from said Manager requesting said indication of status; and means for transferring, using File Transfer Protocol (FTP) commands, said completed accounting files to said Manager.

14. The Agent defined in claim 13 further comprising means for deleting said transferred files upon receipt of said transferred files by said Manager.

* * * * *